3,068,068
RUTILE SEED

Lester A. Kenworthy, Baltimore, Md., assignor to The Glidden Company, Cleveland, Ohio, a corporation of Ohio
No Drawing. Filed Nov. 14, 1960, Ser. No. 68,592
6 Claims. (Cl. 23—202)

This invention relates to a process for the production of a rutile titanium dioxide-inducing seed composition and more particularly to an improved process for preparing a stable colloidal rutile titanium dioxide-inducing seed and its use in a process for hydrolyzing titanium salt solutions.

In the manufacture of titanium dioxide from titanium-bearing ores and slags it is conventional to treat the crude material or mixtures thereof with sulfuric acid to obtain a digestion mass or cake comprising largely acid- and water-soluble sulfates of titanium, iron and minor impurities. In practice, ilmenite ore and/or titanium-bearing slags are comminuted and then reacted at elevated temperatures with concentrated sulfuric acid in a suitable vessel to form the metallic sulfates preparatory to recovery of the titanium values in the form of hydrous titanium oxides. The liquor resulting from the treatment of ilmenite with sulfuric acid, after clarification and concentration, is treated with a seeding agent and then heated near or to the boiling point to effect hydrolysis of the titanium oxide values. The resulting precipitated titanium hydrate is filtered out, washed, dried, calcined and ground, being then ready for use as a pigment.

The best known titanium dioxide pigments, namely, rutile and anatase, have heretofore been prepared generally by the method mentioned above and these pigments possess many desirable properties. Of the two titanium dioxide pigments, rutile titanium dioxide is perhaps the more desirable due to its optimum tinting strength and other physical and chemical characteristics well known to those skilled in the art.

As will be brought out hereinafter, my invention is adapted to a novel process which is an improvement over the heretofore known methods of preparing rutile-inducing seed compositions.

The hydrolysis of titanium sulfate solutions to yield precipitates which, upon washing, drying and calcining, form either anatase or rutile, is generally controlled by the nature of the treatment, temperature and the character of the seed used in said hydrolysis. In the production of rutile titanium dioxide for example, it is important that the seed employed be generally of a small particle size and that it be in the form of a suitable hydrous titanium oxide sol (or washed coagulum thereof) which will disperse readily in a titanium sulfate solution. When such seed is incorporated in small quantities into a titanium sulfate solution, essentially only the titanium values will precipitate upon hydrolysis, even though the solution itself may contain other salts, such as iron and aluminum sulfates, which remain in solution. Hydrolysis is usually effected by heating the material at preferably near the boiling point of the solution at atmospheric or higher pressures until substantially all of the titanium values have been precipitated.

Titanium sulfate solutions, without seed, can be only incompletely hydrolyzed by heating; the metatitanic acid so produced yields, on calcination, pigment of poor quality. However, if a seed is added prior to hydrolysis, then the metatitanic acid obtained results in high-quality $TiO_2$ pigment on calcination.

Many methods for preparing suitable rutile-inducing seeds have been proposed, and some of these have been used commercially in the preparation of titanium dioxide pigments. See for example, Barksdale, "Titanium," pages 249–257 (1949). In some of these well known prior art methods the seeds are prepared by peptizing and heating orthotitanic acid in the presence of an inorganic monobasic acid, typically hydrochloric acid, usually at concentrations of say, 20 to 100 grams $TiO_2$ per liter. In some of these prior art methods, that is, where a mixture of orthotitanic acid and an aqueous inorganic acid such as hydrochloric, hydrobromic, hydriodic or nitric acid is employed in the preparation of rutile $TiO_2$ inducing seeds, the inorganic acid is employed in an amount less than the stoichiometric amount based on the $TiO_2$ content. Small amounts of a stabilizing agent can be used for seed preparation (see for example, U.S. Patent 2,480,869).

An object of my invention is to provide an improved process for the manufacture of a rutile-inducing seed composition for use in hydrolyzing titanium salt solutions.

Other objects of my invention will be understood from a reading of this specification.

I have found that by employing a combination of an inorganic acid such as one selected from the class consisting of hydrochloric acid, hydrobromic acid, hydriodic acid, and an ion exchange resin I can prepare a rutile titanium dioxide-inducing seed composition which has good rutile promoting properties. The seed, prepared in accordance with this invention is eminently suitable for the hydrolysis of titanium sulfate solutions in the manufacture of titanium dioxide pigments.

The results of my novel discovery concerning the employment of a combination of a monovalent inorganic acid and an ion exchange resin in the preparation of colloidal rutile-inducing seeds was unexpected and, as will be shown hereinafter, the stability and rutile promoting properties of the seeds prepared by this process are comparable to or superior to heretofore known prior art seed compositions.

The ion exchange resins applicable in the process of this invention are anion and cation exchange resins in the hydroxyl or chloride form (anion), hydrogen or salt form, e.g., sodium (cation), etc. The ion exchange resins applicable herein and used in Examples 1 through 4, can be prepared according to Example 1 of the D'Alelio Patent U.S. 2,366,007. Ion exchange resins prepared in accordance with the method disclosed by D'Alelio are available commercially, one such cation exchange resin sold under the trademark "Dowex 50." Ion exchange resins prepared according to this method can be visualized as having an elastic, three-dimensional hydrocarbon network containing ion active groups. The network is prepared from a copolymer of styrene and divinylbenzene, the latter serving as a crosslinking agent and also to form a three-dimensional structure. By employing different functional groups different types of ion exchange resins can be produced. Thus, sulfonation of the copolymer yields a strongly acidic resin which will exchange cations; chloromethylation, followed by amination produces a basic resin which will exchange anions. The degree of acidity or basicity of the final resin product is controlled by using different functional groups. For example, if the resin is aminated with trimethylamine, the resin will have quaternary ammonium groups and is strongly basic; amination with N,N-dimethyl ethanol amine results in a similar basic resin. "Dowex 1 and 21K" are illustrative tradenames of anion exchange resins of the quaternary ammonium type, —N(CH₃)₃⁺ (referred to as Type I); whereas "Dowex 2" is representative of the N,N-dimethyl ethanol amine type,

—N(CH₃)₂(C₂H₄OH)⁺

(referred to as Type II). Amination can also be conducted with mixtures of aliphatic polyamines to yield weaker basic resins containing a mixture of primary, secondary, and tertiary amine groups ("Dowex 3").

The ion exchange resins applicable in the process of this invention can contain the following groups: nuclear sulfonic acid (—SO₃H); methylene sulfonic (—CH₂SO₃H); quaternary ammonium; amine; and polyamine. Any cation exchange resin in the hydrogen or sodium form can be used herein; also, anion exchange resins in the chloride or hydroxyl form are applicable. Other ion exchange resins in the phenolic, phosphonic and carboxylic acid forms are included herein. The teachings of U.S. patents 2,366,007; 2,341,907; 2,591,574; 2,591,573; 2,614,009 which concern the preparations of various cation and anion exchange resins are incorporated herein by reference. Reference is also made to a description of the fundamental properties of nuclear sulfonic acid resins in Ind. and Eng. Chem. 39, 2830 (November 1947); and to Kunin and Myers, "Ion Exchange Resins," 1950, J. Wiley and Sons, Inc., and to Nachod and Schubert, "Ion Exchange Technology," 1956, Academic Press, N.Y.C.

The ion exchange resins of commerce are usually available in the Standard 50 to 100 mesh size designation and are supplied in either the hydrogen or sodium form (cation) or hydroxyl or chloride form (anion). (See Product Bulletin 103, J. T. Baker Chemical Co.)

The present invention is concerned with the treatment of a heterogeneous system, e.g., a system wherein titanium is present as a freshly-prepared hydrate, in the form of an aqueous slurry and where an ion exchange resin is added to the system (or the slurry is passed through a bed of ion exchange resin in a column).

One method of preparing the rutile-inducing seed composition of this invention is by the use of a freshly-prepared orthotitanic acid slurry (e.g., less than about 3 weeks old) which can be prepared from titanyl sulfate. In this case, to a well agitated solution of sodium carbonate containing 160 grams of sodium carbonate per liter there is added a relatively pure titanium sulfate solution obtained by dissolving washed metatitanic acid in sulfuric acid and containing 160 grams total sulfuric acid per liter. The addition of titanium sulfate is discontinued when a pH value of 8.5 is attained. The so precipitated orthotitanic acid is filtered and washed substantially sulfate-free. Titanium tetrachloride can also be used to prepare rutile-inducing seeds. (See Barksdale reference above.) In either of these procedures the orthohydrate is thereafter peptized with an inorganic monobasic acid, preferably HCl, but suitably also hydrobromic acid, hydriodic acid, or nitric acid, in the presence of an ion exchange resin. Advantageously, the quantity of the monobasic inorganic acid used is between about 0.4 and 2.5 mols, even more advantageously between about 0.6 and 2.2 and preferably between 0.6 to 1 mol per mole of equivalent TiO₂ present. The use of the inorganic acid itself for peptizing titanium orthohydrate is well known in the art.

The colloidal seed prepared as herein described can contain from, say, 20 to 90 grams per liter of TiO₂, such seed having been peptized and treated with a monovalent inorganic acid and ion exchange resin. The rutile promoting property of these seeds will be demonstrated hereinafter by examples showing calcination of hydrous titanium oxide precipitates.

In accordance with the process of my invention the titanium orthohydrate is peptized in the presence of an ion exchange resin, the sulfonic acid type being referred to hereinafter, and the mixture is heated at a temperature of about 70° C. to the boiling point for from 10 to 30 minutes to develop the nucleating properties of the seed, and the dispersion cooled to room temperature in 10 minutes. The resin is separated by filtering or by any other suitable method. Nucleating properties of the seed can be developed by heating for 10 minutes at the temperatures of say, 40 to 95° C. When properly cured the dispersion has an opalescent appearance and shows a Tyndall effect or Brownian movement or both.

In treating titanium orthohydrate with hydrochloric acid and an ion exchange resin in accordance with my invention, the temperature at which the mixture is cured can vary, but generally, the temperatures referred to hereinabove can be used to obtain beneficial results.

The quantity of ion exchange resin employed in the treatment of the titanium orthohydrate slurry can be varied a great deal, depending upon whether a resin slurry treatment or a fixed bed of resin is used. As noted before, I can pass the slurry through a column containing the ion exchange resin, or I can form a slurry of the resin, the monobasic acid, titanium hydrate, and water in predetermined quantities as will be shown in the examples. For best flow characteristics the slurry has between about ½ and 25% resin solids, and preferably about 5–20% resin solids. The overall beneficial effect imparted by the resin to the seed is not clearly understood and no attempt to explain this phenomenon will be made.

The seeds prepared by the process of this invention can be employed at a level of from about 0.25% to about 2% or higher for the hydrolysis of titanium salt solutions. I have found that the seed prepared according to this method is comparable or superior in hydrolysis operations to heretofore known commercial seeds.

*Example 1*

The following tabulation shows the result of treating for various periods TiO₂ seed hydrate (titanium orthohydrate) with aqueous hydrochloric acid (about 37½% concentration) and cation exchange resin on the one hand, and hydrochloric acid and anion exchange resin on the other, using the resins in various proportions. The seed hydrate was prepared by adding titanium sulfate in sulfuric acid solution to sodium carbonate as described hereinbefore in col. 3, lines 43–55. In each treatment a mixture of the hydrate, HCl, and the ion exchange resin was heated with agitation to 70° C. in 10 minutes, held at 70° C. for 10–25 minutes, then cooled to room temperature in 10 minutes. The resin was filtered off. Subsequently TiO₂ was coagulated with aqua ammonia, filtered, and washed with water.

The anion exchange resin used was a strongly basic quaternary ammonium type in the chloride form having bulk density of about 42 lbs. per cubic ft., about 40% water content as received, and made essentially in accordance with Example 2 of U.S. Patent 2,614,099. The cation exchange resin was a strongly acidic nuclear sulfonic type in the hydrogen form having bulk density of about 52 lbs. per cu. ft., and made by sulfonating a cross-linked polystyrene nucleus essentially as shown in U.S. Patent 2,366,007.

| Test No. | Seed Hydrate, ml. | HCl, ml. | IX Resin | Holding Time, Min. | Remarks |
|---|---|---|---|---|---|
| 1 | 100 | 13 | ¹ 15 | 20 | Stable suspension. |
| 2 | 300 | 39 | ¹ 60 | 25 | Do. |
| 3 | 100 | 13 | ² 20 | 25 | Do. |
| 4 | 300 | 39 | ² 60 | 15 | Do. |

¹ Grams, anionic.
² Grams, cationic.

In similar runs the peptized titaniferous material made in accordance with the invention was examined, e.g., by X-ray, and found to be comparable to a conventional rutile seed. Thus, for example, the crystal size of an inventive seed, prepared with the anion exchange resin shown in Example 1, was measured, as were the crystal sizes of two conventional seeds. The sizes were found to be 91 A. for the inventive ones as against 88 A. and 66 A., respectively, for the conventional ones. The inventive seed showed slightly more hydrolysis activity than either of the other two. When calcined at 900° C. for one hour it yielded 99% rutile titania as against 99% and 65% rutile titania, respectively, for the other two.

*Example 2*

In the following hydrolyses described the solution hydrolyzed was a conventionally reduced and clarified "black liquor" resulting from the attack of sulfuric acid on ilmenite such as the black liquor shown in Table 1 of Example 1 of my copending application S.N. 813,643, filed on May 18, 1959, now U.S. 3,001,854, issued September 26, 1961. The particular black liquor used contained 207.2 grams per liter of equivalent titania, and two liters of the black liquor was used in each hydrolysis run. In each instance the concentration of the inventive rutile seed used was 2%, and to this was added 0.6% gel seed. The gel seed was prepared by neutralizing a black liquor containing about 230 grams per liter of equivalent titania to a pH of 3.9 with strong sodium carbonate solution and diluting the reaction product to 4% equivalent titania content with water.

Hydrolysis was accomplished by refluxing the seeded black liquor for a six-hour period. The precipitated material from hydrolysis in each instance was washed with 10 liters of 5% aqueous sulfuric acid containing 10 cc. per liter of titanous ion. The precipitate was then repulped with 25 cc. of sulfuric acid and 25 cc. of an aqueous titanous ion-containing solution and water at a temperature of 60° for one hour, then refiltered and washed with 10 liters of water containing 3.3 cc. of $H_2SO_4$ per liter, but free of titanous ion.

The table below shows the development of rutile titania obtained by calcining samples of the seeded and hydrolyzed black liquor product at various temperatures. In Test A the seed had been made in essentially the same manner as that of Test 1 of Example 1, i.e., using a Type II quaternary ammonium anion exchange resin and HCl. In Test B the seed had been made also in a similar manner, except that the anion exchange resin used was a strongly basic anion exchanger of quaternary ammonium type in chloride form having bulk density of about 40 lbs. per cu. ft, and the chloromethylated nucleus had been reacted with trimethylamine. Such Type I exchangers can be made as shown in Example 4 of U.S. Patent 2,614,099, or by the method shown in U.S. Patent 2,591,573.

The washed filter cakes were treated with 0.22% potassium carbonate, 0.22% sodium carbonate, and 0.18% $P_2O_5$ (as $H_3PO_4$) in conventional manner, oven-dried at 110° C. overnight, ground, and calcined at the temperatures indicated.

| Temperature, Degrees C./Time | Test A, percent Rutilization Observed | Test B, percent Rutilization Observed |
| --- | --- | --- |
| 915 for 1½ hrs | 59 | 56 |
| 925 for 1½ hrs | 60 | 55 |
| 950 for 1 hr | 70 | 63 |
| 960 for 1 hr | 81 | 71 |
| 970 for 1 hr | 88 | 84 |
| 980 for 1 hr | 91 | 87 |
| 995 for 1 hr | 96 | 95 |
| 1,000 for 1 hr | 99 | 98.5 |

In terms of development of rutile at a given moderate temperature the tabulated results are very good, somewhat superior to those generally obtainable with a conventional seed under comparable conditions. The conventional seed can be made, for example, in the manner of Example 2 of U.S. Patent 2,519,389. This rutilization also is far better than the rutilization obtainable under comparable conditions when hydrochloric acid is the sole peptizing agent in the preparation of the rutile seed used.

In a similar test series a cation exchange resin-treated seed made like that of Test 3 of Example 1 gave virtually the same rutilizing performance as did seed made with the amine Type II exchange resin. It should be understood that the calcination testing simply illustrates the rutile-promoting properties of the seed and is not a critical aspect of this invention.

I claim:

1. A process for producing a stable colloidal rutile-inducing seed which comprises heat curing a mixture of a titanium hydrate and a monobasic inorganic acid in the presence of particulate ion exchange resin at a temperature below the atmospheric boiling point of the mixture, and separating said mixture from the ion exchange resin.

2. The process of claim 1 wherein the ion exchange resin employed is a cation exchanger of the nuclear sulfonic acid type.

3. The process of claim 1 wherein the ion exchange resin employed is an anion exchanger of the quaternary amine type.

4. A process for preparing a stable colloidal rutile-inducing seed which comprises forming an aqueous agitated slurry of orthotitanic acid, sufficient particulate ion exchange resin solids for providing a slurry solids content of about 0.5–25%, and between about 0.4 and 2.5 mols of monobasic inorganic acid per mol of equivalent $TiO_2$ present, maintaining said slurry at a temperature of from 40 to 95° C. for a period of time of from 10 to 30 minutes, and separating the ion exchange resin therefrom.

5. The process of claim 4 wherein the monobasic acid used is HCl.

6. A rutile inducing seed comprising a colloidal dispersion of nuclei of a titanium dioxide in aqueous monobasic inorganic acid, said dispersion having been contacted with particulate ion exchange resin at 40–95° C. for 10 to 30 minutes and separated therefrom.

References Cited in the file of this patent

UNITED STATES PATENTS 2,507,729    McKinney    May 16, 1956
2,971,821    Rummery et al.    Feb. 14, 1961